(No Model.) 2 Sheets—Sheet 1.

C. FLORENCE.
CORN PLANTER.

No. 570,847. Patented Nov. 3, 1896.

WITNESSES:
J. C. B. Bradshaw
A. L. Phelps

INVENTOR
Charles Florence

BY
Staley & Shepherd
ATTORNEYS.

(No Model.) 2 Sheets—Sheet 2.

C. FLORENCE.
CORN PLANTER.

No. 570,847. Patented Nov. 3, 1896.

WITNESSES:
J. C. B. Bradshaw
A. L. Phelps

INVENTOR
Charles Florence.
BY
Staley Shepherd
ATTORNEYS

UNITED STATES PATENT OFFICE.

CHARLES FLORENCE, OF COLUMBUS, OHIO.

CORN-PLANTER.

SPECIFICATION forming part of Letters Patent No. 570,847, dated November 3, 1896.

Application filed May 1, 1893. Renewed August 25, 1896. Serial No. 603,648. (No model.)

*To all whom it may concern:*

Be it known that I, CHARLES FLORENCE, a citizen of the United States, residing at Columbus, in the county of Franklin and State of Ohio, have invented a certain new and useful Improvement in Corn-Planters, of which the following is a specification.

My invention relates to the improvement of corn-planters; and the objects of my invention are to provide a corn-planter of improved construction and arrangement of parts and to facilitate the marking of the corn-hills. These objects I accomplish in the manner illustrated in the accompanying drawings, in which—

Figure 1:
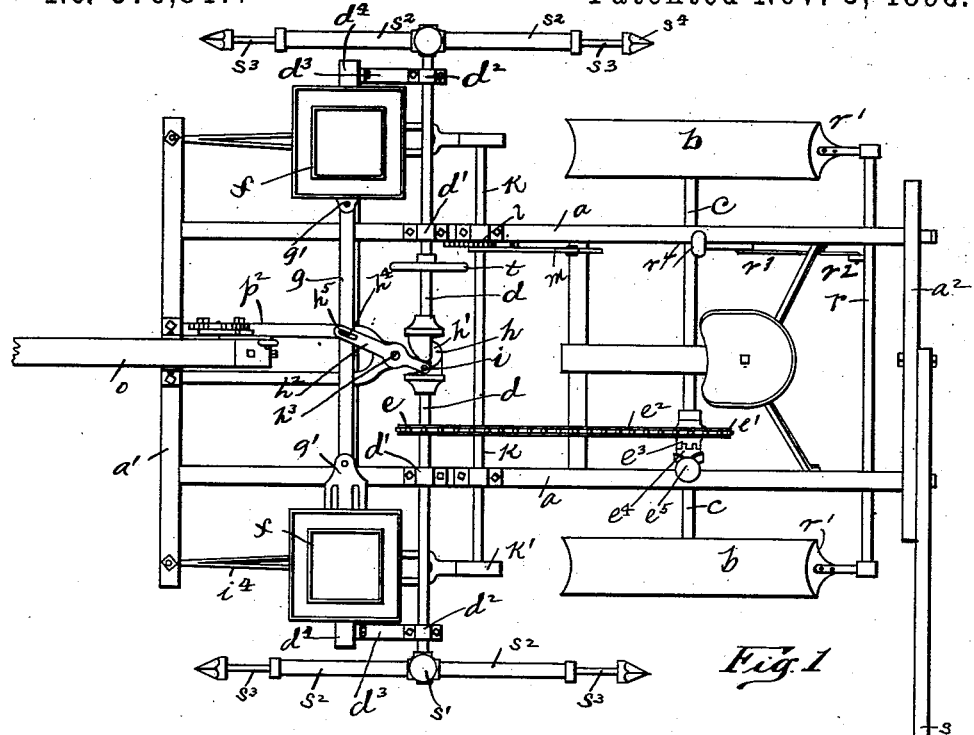
Figure 2:
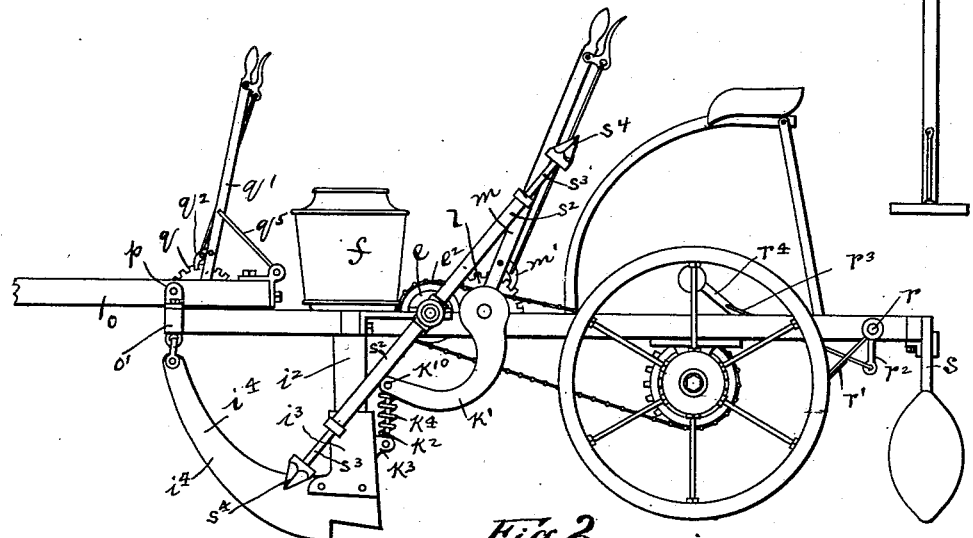
Figure 3:
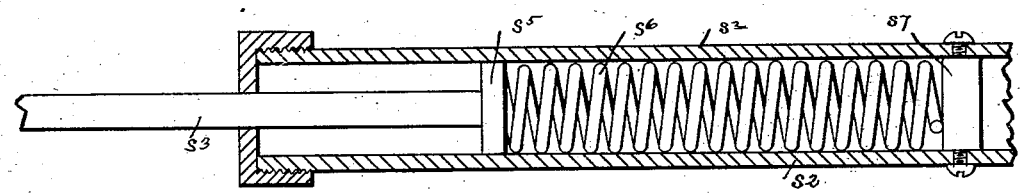
Figure 4:
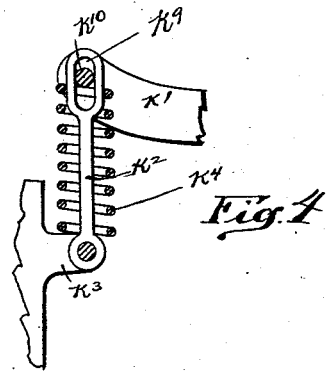

Figure 1 is a plan view of my improved corn-planter. Fig. 2 is a side elevation of the same. Fig. 3 is a detail sectional view of a portion of one of my improved hill-markers, and Fig. 4 is a detail view of the adjustable shoe-support.

Similar letters refer to similar parts throughout the several views.

In the construction of the framework of my improved planter I employ two parallel and oppositely-located side frame-beams $a$, which are connected by end cross-beams $a'$ and $a^2$. $b\ b$ represent the usual ground-wheels, which are carried by the ends of a transverse shaft $c$, the latter being journaled beneath the rear portions of the side frame-beams $a$.

$d$ represents a front shaft which is located in front of the center of the length of the frame-pieces $a$ and which is journaled in suitable boxing $d'$ upon the upper sides of said frame-pieces $a$. The outer end portions of the shaft $d$, which, as shown in the drawings, extend some distance beyond the frame sides, are further journaled in suitable boxings $d^2$, which are supported upon the end of bracket-arms $d^3$, the latter projecting rearwardly from the outer end portions of a laterally-projecting frame-arm $d^4$. As indicated in the drawings, a sprocket-wheel $e$ upon the shaft $d$ is connected with a sprocket-wheel $e'$ upon the shaft $c$ by means of a suitable driving-chain $e^2$. This sprocket-wheel $e'$ is provided with a clutch-hub $e^3$, which is adapted to engage, as shown, with a sliding clutch $e^4$, loose on the shaft $c$ and controlled by a suitable lever $e^5$, connected therewith.

Supported from the framework of the machine, on opposite sides of the forward portion thereof, are the corn or seed hoppers $f$, the latter being of the usual construction. $g$ represents the valve-operating bar, with the ends of which are connected the usual slotted drop-valves $g'$, which by sliding inward and outward open and close the hoppers in the ordinary manner. Upon the central portion of the shaft $d$ is provided a cam $h$, having a double spiral groove $h'$, as shown. $h^2$ is a lever which is pivotally connected at $h^3$ to the framework between the cam $h$ and the bar $g$. The forward end of this lever $h^2$ is provided with a slotted opening $h^4$, through which projects loosely a vertical pin $h^5$ on the bar $g$. The rear end of the lever $h^2$ is provided in the usual manner with a pin $i$, which is adapted to travel in the grooves of the cam $h$. $i^2$ are the usual outlet-tubes of the hoppers, which loosely enter the vertical socket portions $i^3$ on the rear ends of the usual shoes $i^4$. These shoes curve forwardly and upwardly and have their upper ends jointedly connected with the outer end portions of the forward cross frame-piece $a'$.

In rear of the shaft $d$ I journal in the frame-arms $a\ a$ a transverse shaft $k$, the outer projecting ends of which have fixed thereon, as indicated at $k'$, the outer and rear ends of forwardly-extending hook-shaped arms. The forward and lower ends of these arms $k'$ are jointedly connected by a suitable short rod $k^2$ with lugs $k^3$, which project from the rear portions of the shoes $i^4$. These short rods $k^2$ are, as indicated at $k^4$, surrounded by coil-springs, which bear between the lugs $k^3$ and ends of the arms $k'$. As indicated in Fig. 4 of the drawings, the lower end of each of the short rods $k^2$ is pivotally connected with the lug $k^3$, while the upper end of said rod is provided with an elongated slotted opening $k^9$, through which extends loosely a pin $k^{10}$ in the end of the arm $k'$.

To the inner side of one of the frame-pieces $a$, and rising above the shaft $k$, is a toothed stop-plate $l$ of a half-disk form, and upon said shaft $k$, adjacent to said stop-plate, is secured one end of a shaft-operating lever $m$. This lever $m$ is provided, as indicated at $m'$, with the ordinary form of pawl, which is adapted to engage in the usual manner with the desired one of the notches of the stop-plate $l$.

$o$ represents a tongue, the rear end portion of which is fulcrumed between two upwardly-projecting lugs $p$ on the forward cross-piece $a'$. Secured to and rising from a longitudinal frame-piece $p^2$, which extends rearwardly from the forward cross-piece $a'$, is a stop-plate $q$, corresponding with the stop-plate $l$. Fulcrumed to the framework is a lever $q'$, which, as prescribed for the lever $m$, is provided with a pawl $q^2$, which engages with the teeth or notches of the stop-plate $q$. The lever $q'$ is connected, as shown, with the rear end portion of the tongue by means of a coupling rod or link $q^5$.

$r$ represents a transverse shaft which, as shown in the drawings, is journaled in the side frame-pieces $a$, adjacent to the rear end portion thereof. The outer projecting ends of this shaft $r$ carry a forwardly-projecting scraper $r'$, which is adapted to be made to bear against the periphery of the wheels $b\ b$ for the purpose of keeping the latter clear of mud and dirt. As indicated at $r^2$, the shaft $r$ is provided with a short arm, from which extends forwardly and upwardly an operating-rod $r^3$, the latter being jointedly connected with a suitable foot-lever $r^4$, which has one end fulcrumed to the framework.

$s$ is the usual marker-arm, which projects laterally from the rear end portion of the machine.

Upon each of the outer projecting ends of the shaft $d$ is affixed a T-coupling $s'$. Into opposite sides of this coupling are screwed or otherwise secured the inner ends of tubular arms or casings $s^2$. Each of these casings $s^2$ has extending outwardly through the outer end thereof a marking-rod $s^3$, the latter having a pointed end portion $s^4$. The inner end of each of these marking-rods is, as shown in Fig. 3 of the drawings, provided with an enlarged head $s^5$, said head having, as shown, a bearing against the outer end of a coil-spring $s^6$, the inner end of which abuts against a suitable cross stop-piece $s^7$ in the inner end portion of said casing.

$t$ represents a hand-wheel which I preferably employ at a suitable point upon the shaft $d$.

In the operation of my improved corn-planter motion is contributed from the ground-wheels through their shaft $c$ and the chain-belt $e^2$ of the shaft $d$. The rotary motion of the shaft $d$ results in the usual manner in the desired reciprocating motion of the valve-controlling bar $g$ through the connection with said bar of the lever $h^2$ and the contact of the latter with the cam $h$.

By previously turning the hand-wheel $t$ the shaft $d$ is rotated to such position as to result, when the machine is in motion, in one end of each of the marking-arms $s^3$ producing a mark or depression in the ground immediately opposite the corn-hill. In this contact of the marking-rods with the ground it will be observed that the springs $s^6$, against which said rods are cushioned, will take up any jar or shock which might be caused by the contact of the markers with the ground, a stone, or other obstruction.

In making the return trip across a field the slight excavations or marks produced by the pointed ends of the marker-rods will indicate to the driver where the hills of the previous-formed row are located, and the planter may be so arranged as to result in the marker-rods coming into contact with the ground at points opposite the hills of the first row. In this manner it will be observed that an accurate and correct alinement of the corn-hills may be maintained throughout the length of the field.

In order to retain the planter at its proper height, regardless of the height of the horses employed, I have provided the means hereinbefore described for raising and lowering the rear end of the tongue $o$.

In case it is desired to raise or lower the shoes it is evident that a proper movement of the lever $m$ must result in a vertical movement of the shoe in the desired direction. In case the shoes come into contact with stones or other similar obstructions it will be seen that the jar or shock thus imparted to the shoes will be taken up by the springs $k^4$, while the other connecting-rods $k^2$ may be moved upward or downward to the extent of the length of the slots $k^9$.

It will be observed that the construction of my improved corn-planter is simple and reliable and that I provide thereby a reliable and effective means of marking the corn-hills and enabling the driver of the planter to retain the corn-hills in alinement.

Having now fully described my invention, what I claim, and desire to secure by Letters Patent, is—

In a corn-planter, the combination of the framework, the ground-wheels and shaft therefor, a dropping mechanism in the forward portion of said frame, a transverse operating-shaft journaled in said frame, means for operating the dropping mechanism from said operating-shaft, a shoe-supporting shaft journaled in rear of said operating-shaft, hook-shaped arms $k'$ on said shoe-supporting shaft, planter-shoes suspended from the framework at their forward ends, rods connecting the hook-shaped arms and said shoes, said rods having a sliding and pivotal connection with said hook-shaped arms and coil-springs surrounding said rods, substantially as and for the purpose specified.

CHARLES FLORENCE.

In presence of—
C. C. SHEPHERD,
W. L. VAN SIEKLE.